United States Patent
Liang (10) Patent No.: US 8,150,452 B2
(45) Date of Patent: *Apr. 3, 2012

(54) PROVIDING A CONNECTION BETWEEN A MEMORY MEDIUM OF A MOBILE DEVICE AND AN EXTERNAL DEVICE

(75) Inventor: Wayne Liang, Nesconset, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 12/609,714

(22) Filed: Oct. 30, 2009

(65) Prior Publication Data

US 2010/0049895 A1    Feb. 25, 2010

Related U.S. Application Data

(63) Continuation-in-part of application No. 11/941,115, filed on Nov. 16, 2007, now Pat. No. 7,986,962.

(51) Int. Cl.
*H04W 88/02* (2009.01)
(52) U.S. Cl. .................................................. 455/550.1
(58) Field of Classification Search .......... 710/313–314; 455/550.1, 456.1, 456.2, 422.1; 343/329, 343/729; 439/66; 381/94.1; 370/312
See application file for complete search history.

(56) References Cited

U.S. PATENT DOCUMENTS

| | | | |
|---|---|---|---|
| 7,051,169 B2 | 5/2006 | Ganton | |
| 7,197,583 B2 | 3/2007 | Takinosawa et al. | |
| 7,343,439 B2 | 3/2008 | Mills et al. | |
| 7,346,368 B2 | 3/2008 | Llanos et al. | |
| 2006/0056401 A1 | 3/2006 | Bohm et al. | |
| 2008/0042616 A1 | 2/2008 | Monks et al. | |
| 2009/0070515 A1* | 3/2009 | So et al. | 710/311 |
| 2011/0191499 A1* | 8/2011 | Andersson et al. | 710/5 |

OTHER PUBLICATIONS

"New Cypress West Bridge™ Controller Delivers the Market's Fastest Sideloading for PMPs, PNDs, Wireless Cards, and Other Embedded Applications", Business Wire, Dec. 10, 2007; retrieved from Internet on Apr. 30, 2008; <http://findarticles.com/p/articles/mi_m0EIN/is_2007_Dec_10/ai_n21149014>, 2 pages.

"Cypress Develops Peripheral Controller for Multimedia Mobile Handsets", EDA Geek, Nov. 27, 2006; retrieved from Internet Apr. 30, 2008; <http://edageek.com/2006/11/27/cypress-peripheral-controller-handsets/>; 2 pages.

Mark Lapedus, "Cypress Semi forges new mobile device model", EE Times, Nov. 30, 2006; retrieved from Internet Apr. 30, 2008; <http://www.eetimes.com/news/semi/showArticle.jhtml?articleID=19660046>; 4 pages.

* cited by examiner

*Primary Examiner* — Diane Mizrahi
(74) *Attorney, Agent, or Firm* — Meyertons Hood Kivlin Kowert & Goetzel, P.C.; Jeffrey C. Hood; Joel L. Stevens (57) ABSTRACT

System and method for providing a high speed connection to a memory medium of a mobile device. The mobile device may be a mobile phone or other type of portable electronic device. The memory medium may be removable and/or may be flash memory, as desired. The mobile device may include a USB hub that provides a direct high speed connection between an external device and a memory medium of the mobile device. The USB hub may also provide a connection (possibly high speed) between the external device and the processor of the mobile device. The mobile device may also include a high speed connection between the processor of the mobile device and the memory medium.

20 Claims, 8 Drawing Sheets

PROVIDING A CONNECTION BETWEEN A MEMORY MEDIUM OF A MOBILE DEVICE AND AN EXTERNAL DEVICE

PRIORITY CLAIM

This application is a continuation-in-part of U.S. patent application Ser. No. 11/941,115 titled "Providing a High-Speed Connection Between a Memory Medium of a Mobile Device and an External Device" and filed on Nov. 16, 2007 now U.S. Pat. No. 7,986,962, whose inventors were Wayne Liang and Mark C. Atchison and which is hereby incorporated by reference in its entirety as though fully and completely set forth herein.

FIELD OF THE INVENTION

The present invention relates to the field of mobile devices, and more particularly to a system and method for providing high speed communication between an external device and a mobile device.

DESCRIPTION OF THE RELATED ART

In recent years, there has been a proliferation of mobile devices. For example, many people own or purchase various portable devices such as cell phones, music players, video players, and cameras, among other devices. Many of these mobile devices include memory medium(s) for storing information. The memory medium(s) may be internal, external/removable (e.g., non-volatile memory cards such as SD cards). The memory medium(s) may be accessible by a processor of the mobile device or by an external device. However, accessing the memory medium (e.g., by the processor and/or internal memory medium) has not been generally available at high speed due to current design implementations in mobile devices. Correspondingly, improvements in mobile device design are desirable.

SUMMARY OF THE INVENTION

Various embodiments are presented of a system and method for providing high speed communication between an external device and a mobile device. The mobile device may be any of a variety of mobile devices (e.g., including cell phones, personal digital assistants (PDAs), mobile computers, etc.), as desired.

In some embodiments, the system (e.g., a chip inside of the mobile device) may include a first port for coupling to the external device. The first port may include a universal serial bus (USB) port. The system may further include a second port for coupling to a memory medium of the mobile device. The memory medium may be a removable memory medium (e.g., flash cards such as a secure digital (SD) card, among others) or may be a built in memory, as desired. The system may also include a third port for coupling to a processor of the mobile device. In some embodiments, the third port may be operable to use a USB interface (e.g., USB analog or digital interfaces, such as HSIC, ULPI, UTMI, SLPI, etc.) to communicate with the external device and may also use the USB interface to communicate with the memory medium.

Additionally, the system may include a USB hub coupled to the first port. The USB hub may be operable to provide a connection, e.g., a high speed or super speed USB connection (among other possible connections), between the first port and the second port during transfer of data between the external device and the memory medium. Note that the processor of the mobile device may not be required for transfer of data between the external device and the memory medium, thereby allowing for greater processor bandwidth for other activities (e.g., cell phone activities, or other mobile device activities). The USB hub may also provide a high speed or super speed connection (among other possible connections) between the first port and the third port (e.g., for communication between the external device and the processor of the mobile device).

BRIEF DESCRIPTION OF THE DRAWINGS

A better understanding of the present invention can be obtained when the following detailed description of the preferred embodiment is considered in conjunction with the following drawings, in which:

FIGS. 3-5 are flowchart diagrams illustrating various embodiments of a method for providing a connection to a memory medium of a mobile device.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a Flash, magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network and/or other physical transmission medium, that conveys signals such as electrical, electromagnetic, or digital signals.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device—any of various types of portable computing devices, including cell or mobile phones (including smart phones), PDAs, digital cameras, portable media players, etc. In general, the term "mobile device" can be defined to encompass devices (or combinations thereof) which include at least one processor that executes instructions from a memory medium and is easily portable (e.g., handheld) by a user.

Figure 1:
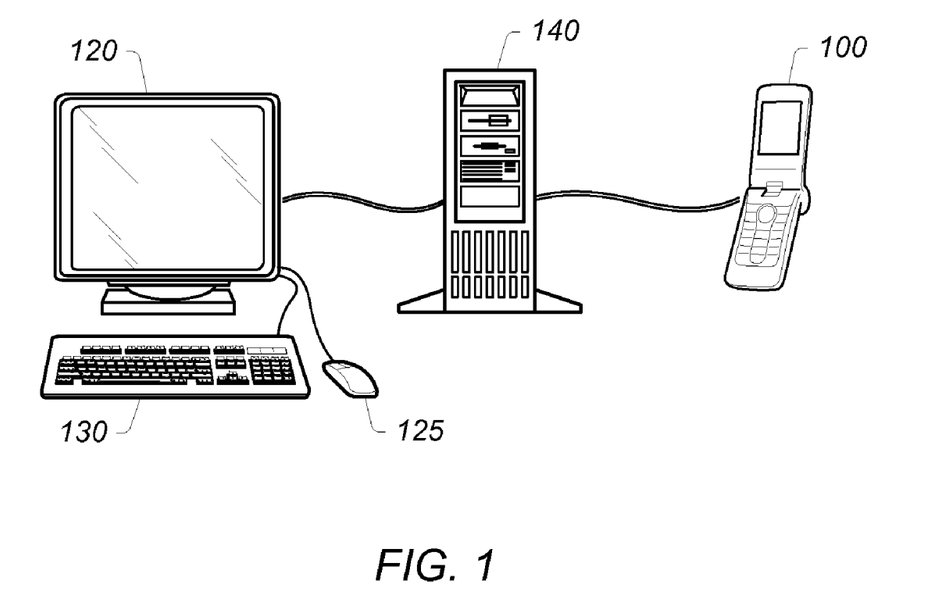
FIG. 1 illustrates an exemplary system suitable for implementing various embodiments of the invention.

FIG. 1—Exemplary Systems

FIG. 1 illustrates one embodiment of an exemplary system operable to allow for high speed connection between an external device (such as a computer system) and a memory medium of a portable device. As shown, the mobile device 100 may be coupled to external device 140 (possibly via a hub).

The mobile device 100 may be any of numerous devices. For example, the mobile device 100 may be a cell or mobile phone (e.g., a flip phone with an LCD display, a single screen phone, such as a Blackberry™ or iPhone™, among others), a personal media player (e.g., an mp3 player, and/or an IPOD™, among other players, a CD player, a digital video player, a DVD player, etc.), a digital camera, or any other mobile device. In some embodiments, the mobile device 100 may be a universal serial bus (USB) device. Additionally, the mobile device may be coupled to the external device 140 via a hub, possibly a USB hub, as desired. Additionally, as described herein, the mobile device may include a processor and one or more memory mediums. The memory medium(s) may be accessible by the processor of the mobile device 100 and/or the external device 140, among others. Further descriptions regarding embodiments of elements of the mobile device are found below in descriptions regarding FIGS. 2A-2C. Thus, the mobile device 100 may be any of a variety of appropriate devices.

Additionally, the external device 140 may be any of various external devices; more specifically, the external device 140 may be a computer system (e.g., as shown, with input devices 125 and 130 and display 120) and/or other types of external devices, e.g., ones that access a memory medium of the mobile device 100. Alternatively, or additionally, the external device 140 may be a second USB device, e.g., similar to the mobile device 100, among others. For example, in one embodiment, the second mobile device may be a USB on-the-go (OTG) device which may be operable to act as a host and a device, e.g., depending on the situation. Thus, according to various embodiments the external device 140 may be any of various appropriate devices.

Additionally, the external device 140 may include at least one memory medium on which one or more computer programs or software components may be stored. For example, the memory medium may store operating system software, as well as other software for operation of the external device 140. Various embodiments further include receiving or storing instructions and/or data implemented in accordance with the foregoing description upon a carrier medium. Note that the above descriptions of the external device 140 and the mobile device 100 are exemplary only and other components and systems are envisioned. Thus, FIG. 1 illustrates an exemplary system according to some embodiments.

Figure 2A:
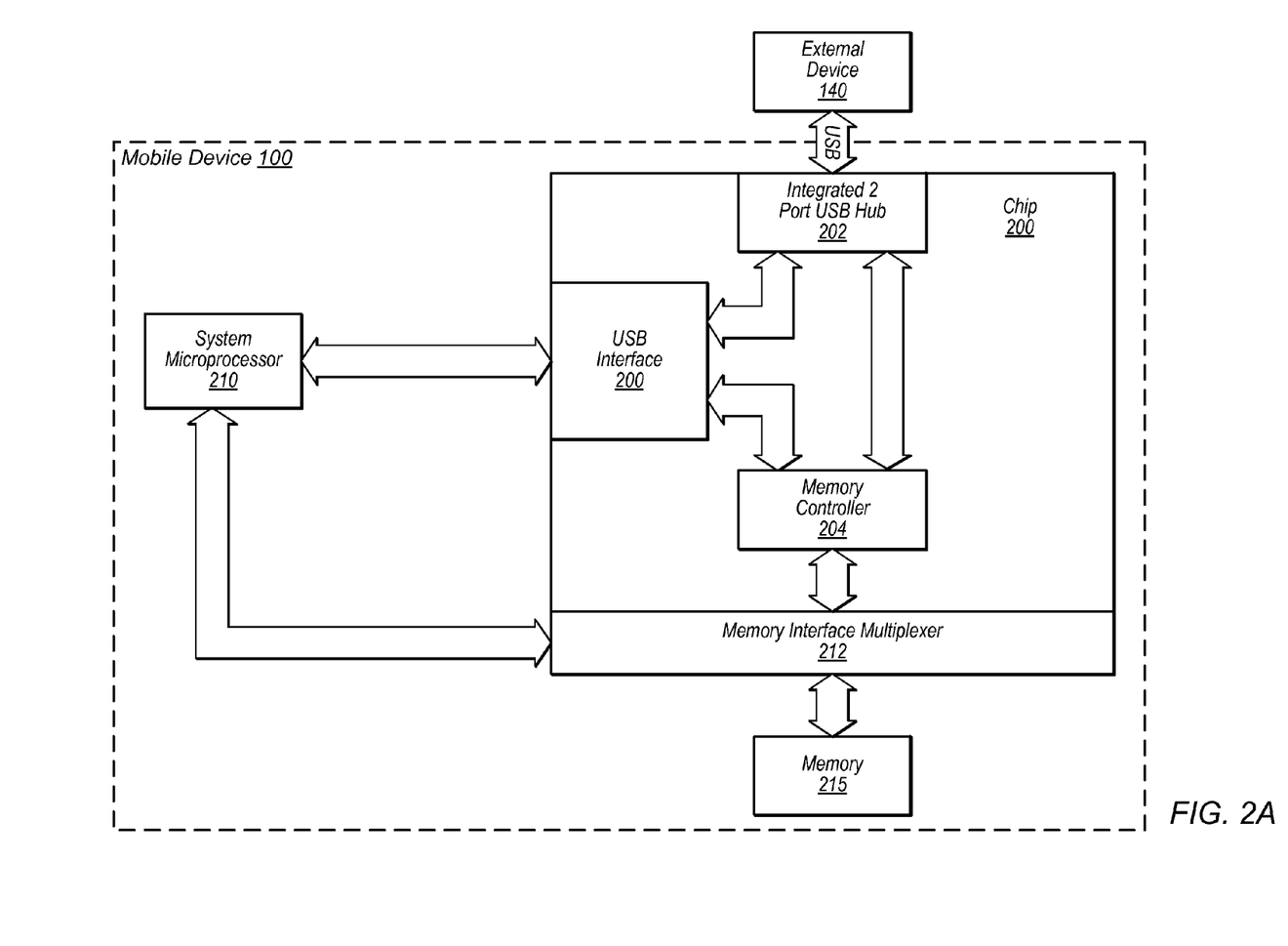
FIGS. 2A-2C are exemplary block diagrams of a mobile device, according to one embodiment.
Figure 2B:
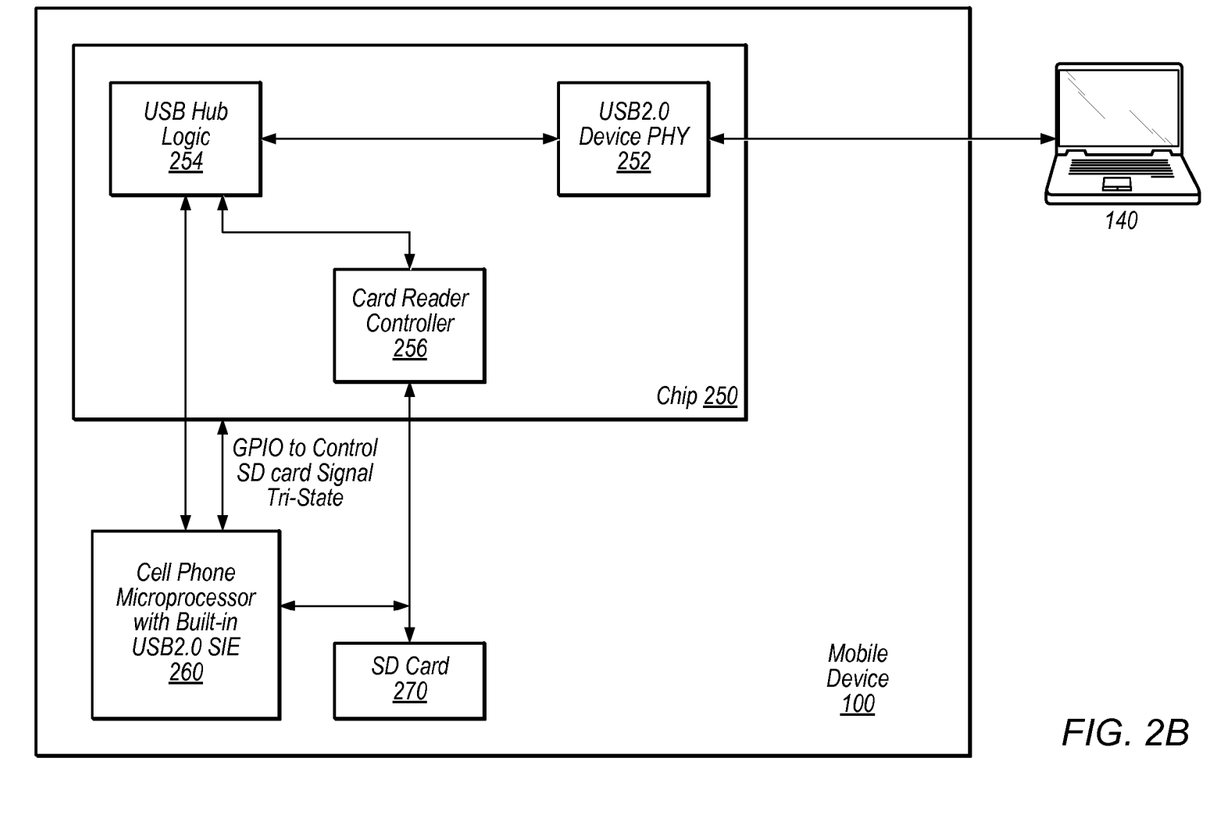
Figure 2C:
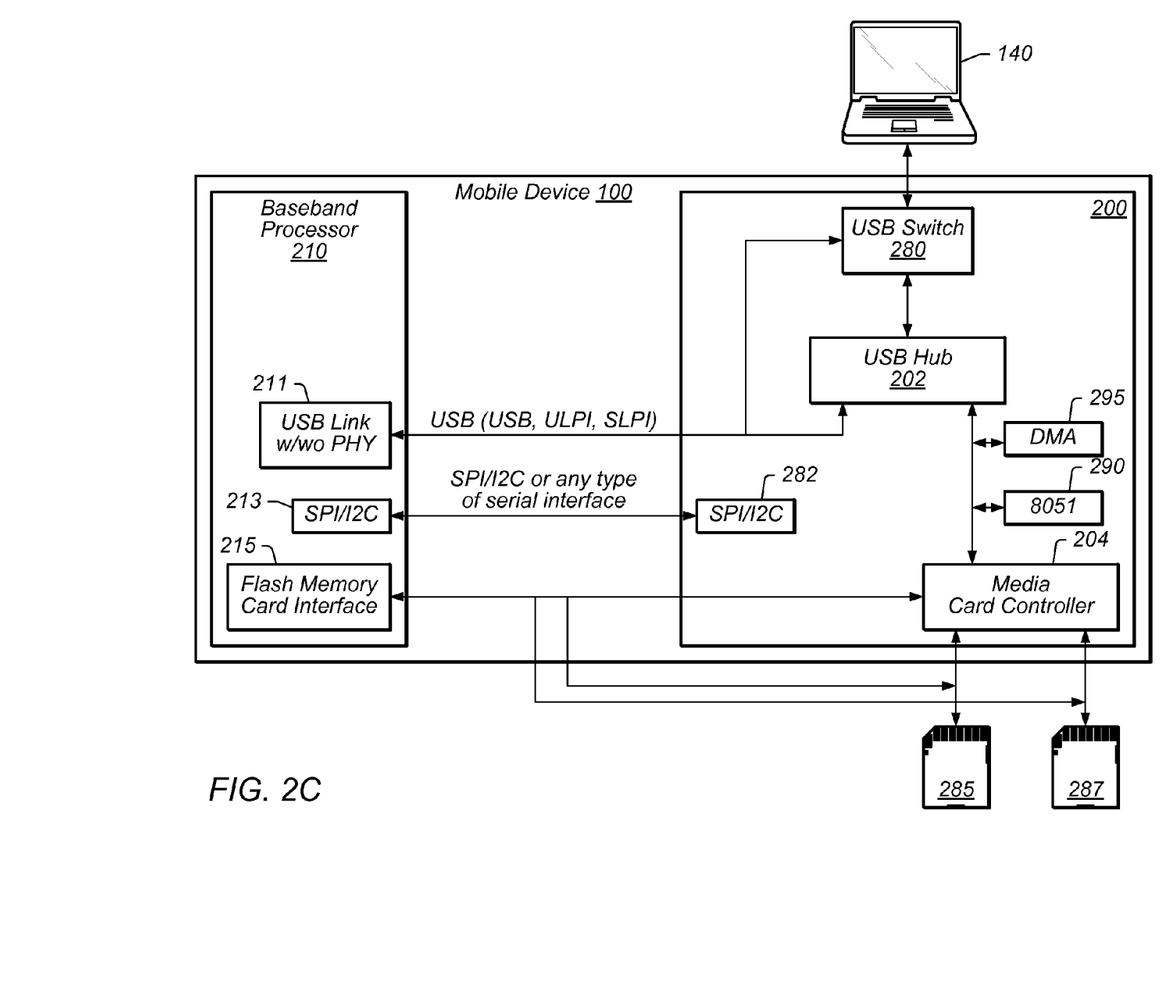

FIGS. 2A-2C—Exemplary Block Diagrams of a Mobile Device

FIGS. 2A-2C are exemplary block diagrams of the block diagram 100.

As shown in FIG. 2A, the mobile device 100 may include a chip or device 200. The chip 200 may include an internal multiple port (in this case, a two port) USB hub 202 which may be usable to connect to the external device 140 (e.g., via USB, as shown). The USB hub 202 may also be connected to the memory controller 204 (for transmission and reception of data to/from the memory 215), to the system microprocessor 210 via USB interface 200, and to other internal devices via USB. The interface between the USB hub 202 and the system microprocessor 210 may be any of various USB analog or digital interfaces, e.g., HSIC, ULPI, SLPI, etc. The chip 200 may include its own processor, e.g., an 8051 controller (referred to as a processor 290) and/or a direct memory access (DMA) controller 295 (See FIG. 2C). According to various embodiments, the processor 290 may be comprised in the memory controller 204, which may be configured to perform various DMA procedures during transfers of data, e.g., USB transfers, or may be comprised in the chip 200, but outside the memory controller 204.

The system microprocessor 210 (sometimes referred to as a baseband processor or SOC processor) may also be connected to the integrated memory controller 204 via USB interface 200. In one embodiment, the USB interface may include a first set of registers and a second set (e.g., an extended set) of registers for communication. Thus, in one embodiment, the processor may use a first set of registers of the USB interface 200 to communicate with the external device 140 and a second set of registers of the USB interface 200 to communicate with the memory medium 215. Note that the USB interface 200 may be used initially to set up a connection (e.g., to initiate a transfer of 500 bytes from a specific memory location, for example) or may be used via a polling mechanism, where specific information is requested and received on specific pins of the USB interface 200. Thus, to transfer information between the processor 210 and the memory medium 215, the USB interface (and possibly extended registers of the USB interface) may be used to initiate the transfer and/or may be used during the transfer. By using the USB interface, the transfer of data of the processor 210 may be performed at a USB high or super speed transfer rate (among other possible connection speeds).

As shown, the USB hub 202, the memory controller 204, and the USB interface 200 (and possibly the memory interface multiplexer 212) may all be included on a single chip or system 200.

The memory 215 may be any type of memory medium, as desired. For example, the memory 215 may be non-volatile memory such as flash and/or may be a removable memory medium. In one embodiment, the memory 215 may be a memory card, e.g., an SD (secure digital) card, or a high speed SIM (subscriber identity module) card which stores information (among other types of memory cards such as a memory stick, compactflash, etc.). Thus, the memory 215 may be any type of memory medium, as desired.

In some embodiments, the system microprocessor 210 may communicate with the memory 215 via the USB interface 200 and integrated memory controller 204 and/or the memory interface multiplexer 212. However, in some embodiments, the system microprocessor 210 may only use the memory interface multiplexer 212 when the USB interface cannot be used (e.g., when the system microprocessor does not support the USB interface). Note that, as shown, the memory interface multiplexer 212 may be optional, and may only be provided for backwards compatibility, as desired. Thus, when present, the memory interface multiplexer 212 may handle requests from the system microprocessor 210 and the memory controller 204.

An alternative block diagram of the mobile device 100 is shown in FIG. 2B, according to one embodiment. As shown, chip 250 may include a USB 2.0 device PHY 252 for coupling to external device 140, USB hub logic 254 (coupled to the PHY 252 e.g., using a USB interface), and a card reader controller 256. Additionally, the USB hub 254 may be coupled to the cell phone microprocessor with built-in USB SIE (serial interface engine) 260. The card reader controller 256 and the microprocessor 260 may be each coupled to SD card 270.

FIG. 2C illustrates a more detailed embodiment of the mobile device 100. As shown, the mobile device 100 is coupled to the external device 140. The mobile device 100 includes the baseband processor 210 as well as the chip 200. As also shown, the chip 200 includes a USB switch 280, which may either couple the external device 140 to the USB Hub 202 or the USB link (with or without a PHY) 211 of the baseband processor 210. Thus USB hub 202 is also coupled to USB link 211. As indicated various different analog or digital USB connections may be used, such as USB, ULPI, SLPI, etc. Similar to previous diagrams, the USB hub 202 is coupled to flash media card controller 204, which in turn is coupled to memory mediums 285 and 287 (although the number of memory mediums may vary).

The baseband processor 210 also includes SPI/I2C block 213 which may communicate with the chip 200 via SPI/I2C block 282. The baseband processor 210 may communicate various commands/information to the chip 200 via blocks 213 and 282. For example, the baseband processor 210 may power off the chip 200 using a power off command, although other commands are envisioned.

Additionally, the baseband processor 210 may include a memory card interface 215, which may couple to the memory mediums 285 and 287 directly or may couple to the media card controller 204.

Different pathways provided by the chip 200 may be used for various different modes. For example, in a first mode, the chip 200 may be turned off, and the USB switch 280 may pass signals from the external device 140 to the baseband processor 210. In this mode, the external device 140 may not recognize the memory mediums 285 and 287 as separate devices.

In a second mode, the USB switch 280 may pass signals to the USB hub 202, e.g., when the chip 200 is enabled or in use. In this mode, USB signals may be passed from the external device 140 to the baseband processor 210 and/or the memory mediums 285 and 287 (via the media card controller 204). Additionally, the baseband processor 210 may be able to communicate with the memory mediums 285 and 287, e.g., via extended registers.

In a third mode, the baseband processor 210 may communicate with the memory mediums 285 and 287 without using the USB hub 202. In this mode, the baseband processor may use memory card interface 215 to communicate with media card controller 204. In some embodiments, the memory card interface 215 may be fully compatible with the memory mediums 285 and 287.

In a fourth mode (similar to the first mode), the chip 200 may not be powered on, and the baseband processor, where the memory card interface 215 is compatible with memory mediums 285 and 287, may communicate directly with the memory mediums. Note that the above described modes are exemplary only, and that further modifications and implementations are envisioned.

Figure 3:
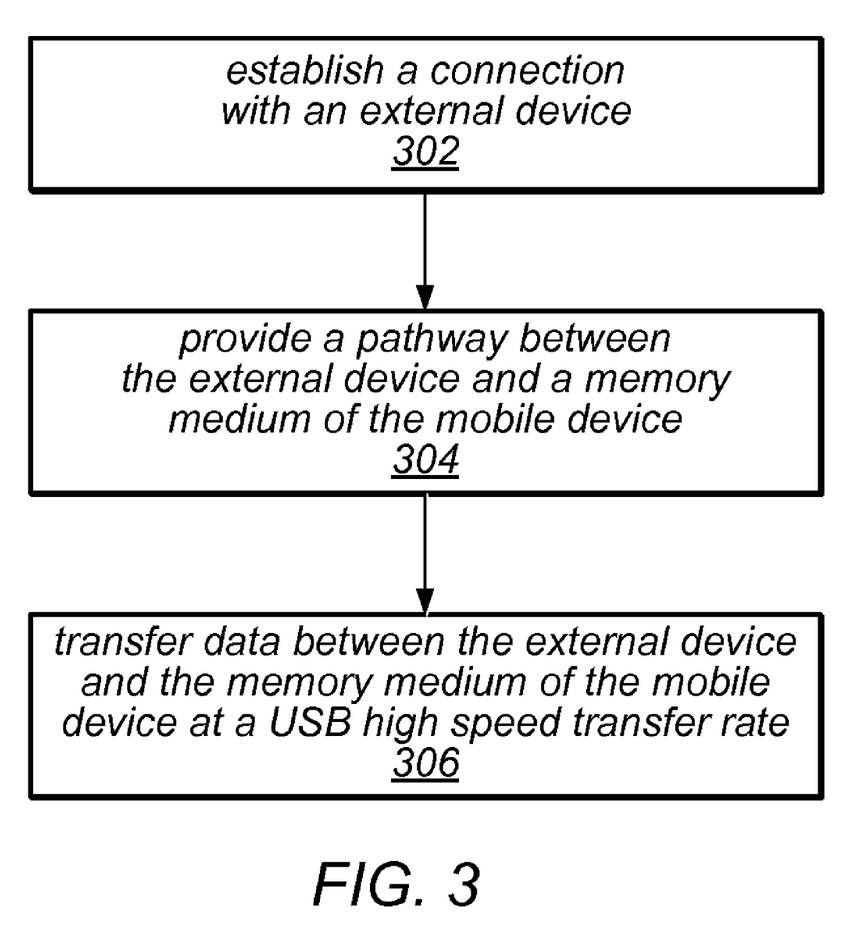

Thus, FIGS. 2A-2C provide exemplary block diagrams for the mobile device 100, according to various embodiments.
FIG. 3—Flowchart FIG. 3 illustrates a method for providing a connection to a memory medium of a mobile device. The method shown in FIG. 3 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, a connection may be established between a mobile device and an external device. In one embodiment, the connection may be established with a memory medium of the mobile device and the external device. The external device may be connected to the mobile device via a first port of the mobile device. The connection may be established by logic of a device or chip within the mobile device, such as those described above in FIGS. 2A-2C.

For example, the hub logic of the chip may establish the connection with the mobile device. Note that the hub logic may be a 2 port USB hub as described above, but may be any type of hub as desired. For example, the hub may be a switching hub with more than 2 ports, e.g., one or more ports for external devices and a plurality of ports for components of the mobile device, as desired.

In various embodiments, the connection may be established according to various protocols. For example, in one embodiment, the connection may be established according to USB protocols, e.g., using an enumeration process. However, note that various on the go (OTG) protocols (e.g., as defined in the USB specification) may be used, as desired.

As indicated above, the external device may be any of a variety of devices (e.g., computers or other devices) and the mobile device may be any of a variety of portable devices (e.g., cell phones, portable media players, PDAs, etc.). Thus, a connection may be established between the mobile device and the external device.

In 304, a pathway may be provided between the memory medium of the mobile device and the external device. Note that the provided pathway may not include a processor of the mobile device. Correspondingly, transfer of data may not be limited by the processor, nor may transfer of data between the memory medium and the external device affect processing of the processor of the mobile device. The provided pathway may include the USB hub of the mobile device, a memory controller of the mobile device, and possibly a memory interface multiplexer, among other possibilities. Exemplary pathways are illustrated in FIGS. 2A-2C above. However, note that the method is not limited to those pathways described herein or the block diagrams provided by FIGS. 2A-2C.

In 306, data may be transferred between the external device and the memory medium of the mobile device, e.g., at a USB high or super speed transfer rate (among other possible speeds), using the provided pathway. The USB high transfer rate may be a USB 2.0 high transfer rate (e.g., 480 Mbps), or greater transfer rates, for example. In further embodiments, the USB transfer rate may be a super speed transfer rate, e.g., as supported by the USB 3.0 protocol. However, USB transfer rates may refer to speeds greater than the transfer rates offered by USB 1.1, 2.0, or 3.0 rates.

As noted above, the transfer of data may not include use of the processor of the mobile device. However, in some embodiments, the processor may be used for some limited activities, but may not affect the transfer rate, nor limit the bandwidth of the processor for normal mobile device activities. Accordingly, during transfer of data in 306, the processor may be operable to execute various other procedures (e.g., associated with the mobile device, such as making phone calls, playing back media, transferring data to other memories, etc.). Similarly, the local bus of the mobile device may not be affected by the transfer of data in 306. Accordingly, the direct pathway between the external device and the memory medium may allow the mobile device to operate as if the transfer of data is not occurring. Thus, the local bus (or bandwidth of the processor) of the mobile device may not be limited by the transfer of data because the pathway does not involve the local bus (or processor).

The data transferred in 306 may be any type of data, as desired. For example, a user may wish to put media (music, video, photographs, etc.), documents, contact information, and/or other information on the memory medium for access while away from a computer (or the external device). Thus, a user may quickly transfer information from an external device to the mobile device.

In some embodiments, as noted above, the method may further include transferring data between the processor and the external device, e.g., using a USB interface, and/or transferring data between the processor and the memory medium, e.g., using the USB interface. However, the processor may optionally transfer data to/from the memory medium using a memory interface without using the USB interface (e.g., when the processor does not support transfer of data through the USB interface). Where the memory is an SD card, the transfer of data may occur via an SD memory interface using an SD I/O port.

Figure 4A:
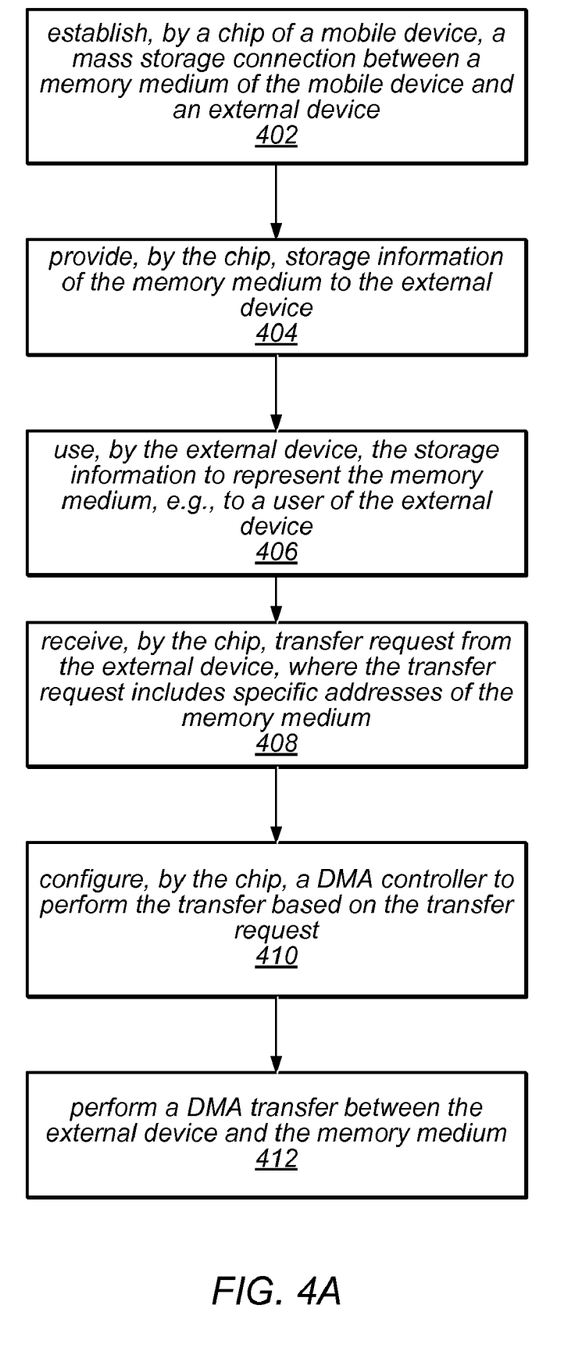
Figure 4B:
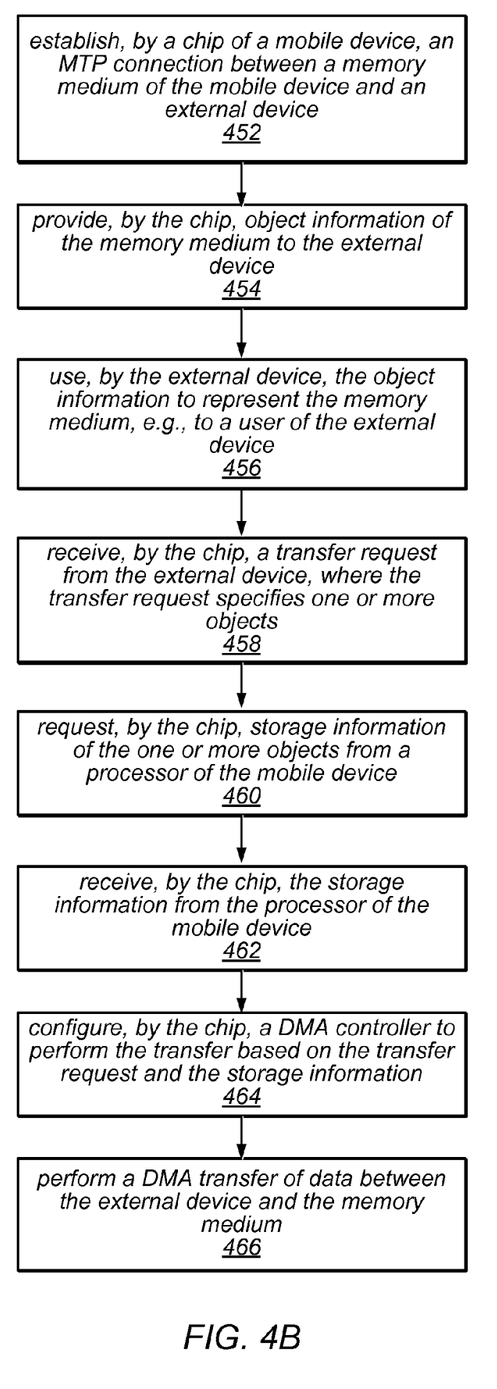

FIGS. 4A-4B—Flowchart

FIGS. 4A and 4B illustrate two specific embodiments of the method of FIG. 3, which do not limit the scope of the method already described. Similar to above, the methods shown in FIGS. 4A and 4B may be used in conjunction with any of the systems or devices shown in the above Figures, among other devices. In various embodiments, some of the method elements shown may be performed concurrently, in a different order than shown, or may be omitted. Additional method elements may also be performed as desired. As shown, the method of 4A, where the memory medium of the mobile device may be enumerated as a mass storage device, may operate as follows.

In 402, a connection may be established between a mobile device and an external device, according to the methods described herein. More specifically, the external device may enumerate a memory medium of the mobile device as a mass storage device, e.g., a USB mass storage device. The connection may be established by logic of a device or chip within the mobile device, such as those described above in FIGS. 2A-2C. For example, a microcontroller, such as an 8051 processor, may fulfill the enumeration responsibilities for the memory medium of the mobile device.

In 404, storage information of the memory medium may be provided to the external device, e.g., by a processor of the chip of the mobile device. The storage information may indicate the particular locations of files and directories on the memory medium. For example, an allocation table (e.g., a file allocation table (FAT)) may be provided to the external device. Alternatively, or additionally, the storage information may be used by the external device to create such an allocation table, e.g., stored in memory of the external device. Accordingly, the external device may be aware of the location of files and directories for future reads or writes. Additionally, the external device may be able to provide such information to a user, e.g., to browse or otherwise manipulate the files stored on the memory medium.

Thus, in 406, the external device may use the storage information to represent the memory medium. For example, the memory medium may store media files, such as pictures and songs, which a user may wish to browse, retrieve, or add to (e.g., add additional media files to the memory medium, e.g., for mobile listening of viewing). Upon establishing a connection in 402 (using the external device) and retrieving the storage information in 404, the user may browse the files stored on the memory medium of the mobile device using, for example, the external device.

Data may be transferred between the external device and the memory medium of the mobile device, e.g., at a USB high or super speed transfer rate (among other possible speeds), using the provided pathway. The USB high transfer rate may be a USB 2.0 high transfer rate (e.g., 480 Mbps), or greater transfer rates, for example. In further embodiments, the USB transfer rate may be a super speed transfer rate, e.g., as supported by the USB 3.0 protocol. However, USB transfer rates may refer to speeds greater than the transfer rates offered by USB 1.1, 2.0, or 3.0 rates.

The data may be transferred according to typical USB mass storage device protocols. More specifically, the external device, which typically will act as the USB host, may initiate a transfer of data between the memory and the external device. For example, in 408, the external device may initiate a transfer of one or more files from the mobile device memory to a memory of the external device, e.g., by sending a request for the transfer. Alternatively, the external device may initiate a transfer of files from the external device to the memory of the mobile device. The data transfer requests may explicitly refer to blocks of data and/or addresses of the memory medium of the mobile device, e.g., based on the storage information received in 404 above.

In response, the memory controller (e.g., the processor) of the chip on the mobile device may set up a transfer (e.g., a DMA transfer, e.g., using a DMA controller) of the requested blocks from/to the external device, depending on the request. More specifically, in 410, a processor of the chip may set up a DMA transfer between the external device and the memory medium of the mobile device by configuring a DMA controller of the chip to perform the DMA transfer. Accordingly, in 412, the DMA transfer may be performed and the requested data may be transferred between the external device and the memory medium of the mobile device using the received storage information in 404.

As noted above, the transfer of data may not include use of the device or SOC processor of the mobile device. However, in some embodiments, the processor may be used for some limited activities, but may not affect the transfer rate, nor limit the bandwidth of the processor for normal mobile device activities. Accordingly, during transfer of data in 408, the processor may be operable to execute various other procedures (e.g., associated with the mobile device, such as making phone calls, playing back media, transferring data to other memories, etc.). Similarly, the local bus of the mobile device may not be affected by the transfer of data in 408. Accordingly, the direct pathway between the external device and the memory medium may allow the mobile device to operate as if the transfer of data is not occurring. Thus, the local bus (or bandwidth of the processor) of the mobile device may not be limited by the transfer of data because the pathway does not involve the local bus (or processor).

The data transferred in 408 may be any type of data, as desired. For example, a user may wish to put media (music, video, photographs, etc.), documents, contact information, and/or other information on the memory medium for access while away from a computer (or the external device). Thus, a user may quickly transfer information from an external device to the mobile device.

The method of FIG. 4B, described below, may relate to an alternative embodiment, where the memory medium of the mobile device is enumerated as a media transfer protocol (MTP) device. As shown, the method may operate as follows:

In 452, a connection may be established between a mobile device and an external device, according to the methods described herein. More specifically, the external device may enumerate the memory medium of the mobile device as a MTP device, e.g., a USB MTP device. Thus, in one embodiment, the external device may be the MTP initiator, and the memory medium of the mobile device (e.g., enabled by logic of FIGS. 2A-2C) may be the MTP responder. Thus, the connection may be established by logic of a device or chip within the mobile device, such as those described above in FIGS. 2A-2C.

In 454, object information of the memory medium may be provided to the external device. The object information may be provided by a controller or processor of the chip in the mobile device. The object information may identify each of the objects stored on the memory medium of the mobile device. For example, an object may be a picture file, music file, a video file, etc. The object information may include a list of all the objects as well as meta data for each of the objects. For example, the object information for a particular picture object may include a name of the object, a location of the object, a thumbnail of the object, etc. Thus, the external device may be made aware of a subset or all of the objects stored on the memory medium of the mobile device. In 456, the external device may use this information to allow a user to browse the contents of the memory medium of the mobile device, e.g., to browse or otherwise manipulate the files stored on the memory medium.

Thus, the memory medium may store object files, such as pictures and songs, which a user may wish to browse, retrieve, or add to (e.g., add additional media files to the memory medium, e.g., for mobile listening of viewing). Upon establishing a connection in 452 (using the external device) and retrieving the object information in 454, the user may browse the files stored on the memory medium of the mobile device using, for example, the external device.

Data may be transferred between the external device and the memory medium of the mobile device, e.g., at a USB high or super speed transfer rate (among other possible speeds), using the provided pathway. The USB high transfer rate may be a USB 2.0 high transfer rate (e.g., 480 Mbps), or greater transfer rates, for example. In further embodiments, the USB transfer rate may be a super speed transfer rate, e.g., as supported by the USB 3.0 protocol. However, USB transfer rates may refer to speeds greater than the transfer rates offered by USB 1.1, 2.0, or 3.0 rates.

The data may be transferred according to MTP protocols. More specifically, in 458, the external device, which typically will act as the USB host, may provide a request for data in terms of one or more objects. For example, the external device may request that an object be transferred from the memory medium to the external device. Accordingly, the external device may send a request that indicates the objects. However, according to MTP protocols, the storage information of the objects may be stored and/or maintained by the SOC (e.g., the processor) of the mobile device. Accordingly, in 460, the memory medium controller or processor 290 (e.g., the 8051 controller) of the chip 200 may request the storage information of the requested objects from the SOC of the mobile device. In 462, the SOC (e.g., the processor of the mobile device) may then provide the storage information to the memory medium controller, which may then initiate a transfer of the requested data to the external device. More specifically, in 464, the controller (e.g., an 8051 processor) of the chip on the mobile device may configure a DMA controller to perform the transfer based on the transfer request from the external device and the storage information from the SOC processor. Finally, in 466, a DMA transfer of data between the external device and the memory medium may be performed.

Alternatively, or additionally, the external device may transfer one or more new objects to the memory medium. Similar to above, the memory medium (or the processor of the chip 200) controller may determine where to store the new objects by sending a request to the SOC (e.g., the processor). Upon determining where to store the information, in 462, the new objects may be transferred from the external device and stored on the memory medium in steps similar to 464 and 466.

After the determination of the memory locations, the transfer of data may not include use of the processor of the mobile device. Accordingly, during transfer of data in 466, the processor may be operable to execute various other procedures (e.g., associated with the mobile device, such as making phone calls, playing back media, transferring data to other memories, etc.). Similarly, the local bus of the mobile device may not be affected by the transfer of data in 466. Accordingly, the direct pathway between the external device and the memory medium may allow the mobile device to operate as if the transfer of data is not occurring. Thus, the local bus (or bandwidth of the processor) of the mobile device may not be limited by the transfer of data because the pathway does not involve the local bus (or processor).

The data transferred in 466 may be any type of data, as desired. For example, a user may wish to put media (music, video, photographs, etc.), documents, contact information, and/or other information on the memory medium for access while away from a computer (or the external device). Thus, a user may quickly transfer information from an external device to the mobile device.

Figure 5:
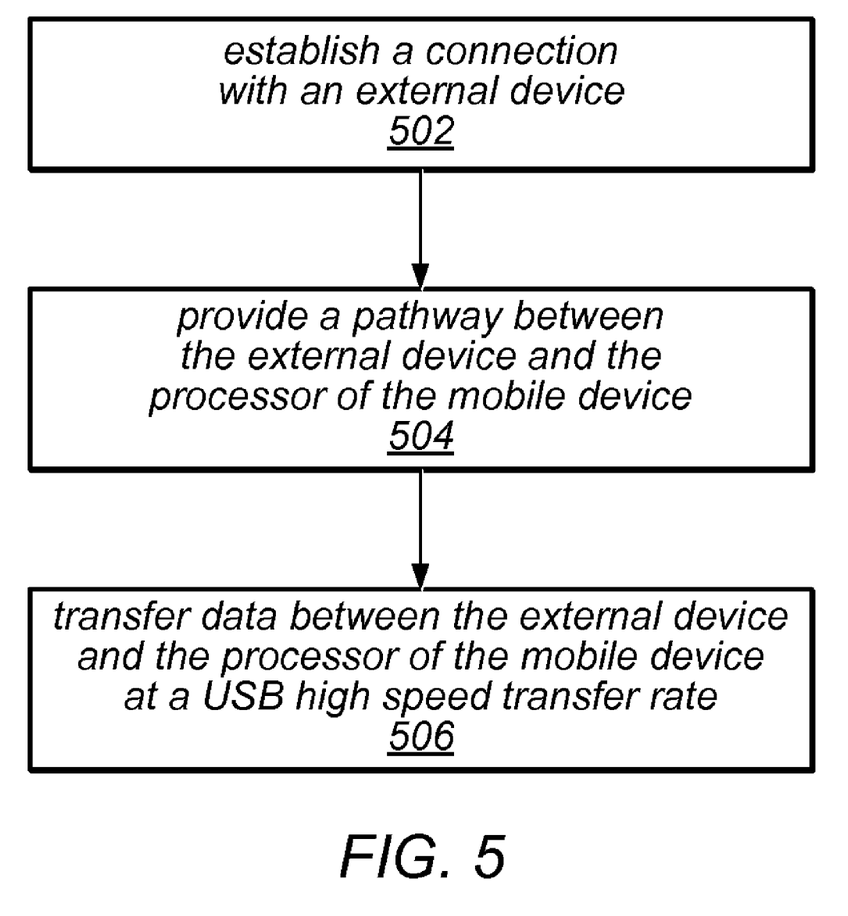

FIG. 5—Flowchart

FIG. 5 illustrates a method for providing a high speed connection to a memory medium of a mobile device. The method shown in FIG. 4 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a connection may be established a mobile device and an external device. In one embodiment, the connection may be established with a processor of the mobile device and the external device. The external device may be connected to the mobile device via a first port of the mobile device. The connection may be established by logic of a device or chip within the mobile device, such as those described above in FIGS. 2A-2C. For example, as indicated above, the hub logic of the chip may establish the connection with the mobile device. In various embodiments, the connection may be established according to various protocols. For example, in one embodiment, the connection may be established according to USB protocols, e.g., using an enumeration process. However, note that various on the go (OTG) protocols (e.g., as defined in the USB specification) may be used, as desired.

As indicated above, the external device may be any of a variety of devices (e.g., computers or other devices) and the mobile device may be any of a variety of portable devices (e.g., cell phones, portable media players, PDAs, etc.). Thus, a connection may be established between the mobile device and the external device.

In 504, a pathway may be provided between the processor of the mobile device and the external device may be provided. The provided pathway may include the USB hub of the mobile device, and an interface to the processor (e.g., a USB interface, possibly using a first set of standard registers). Exemplary pathways are illustrated in FIGS. 2A-2C above. However, note that the method is not limited to those pathways described herein or the block diagrams provided by FIGS. 2A-2C.

In 506, data may be transferred between the external device and the processor of the mobile device, e.g., at a USB high or super speed transfer rate (among other possible rates), using the provided pathway. The USB transfer rate may be a USB 2.0 high transfer rate (e.g., 480 Mbps), or greater transfer rates, such as a USB 3.0 super speed transfer rate, for example. However, the USB transfer rate may refer to speeds greater than the transfer rates offered by USB 1.1. Note that this transfer of data may not affect the local bus of the device since the processor communicates over a dedicated interface (e.g., the USB interface) and pathway, which does not include the local bus.

During transfer of data, the processor may act as an intermediate device (or go between) between the external device and memory mediums of the mobile device (e.g., SIM cards, SD cards, flash memory, and/or other memory). For example, the transfer of data between the external device and the processor may involve updating the firmware of the mobile device and/or updating stored files, contacts, and/or other information of the mobile device, as desired. Note that during transfer of data to the processor, the processor may be limited (e.g., a significant portion of the processing capability of the processor may be used), and correspondingly, other activities of the processor may be limited. For example, where the mobile device is a cell phone, the processor may not be able to perform calls and/or other activities while performing this data transfer (unlike embodiments described above regarding FIGS. 3-4B).

In some embodiments, as noted above, the method may further include transferring data between the processor and a memory medium of the mobile device, e.g., using the USB interface (e.g., a second set of registers of the USB interface) or using a different pathway. Similar to above, this transfer between the processor and the memory medium may not interfere with data transfer occurring over the local bus of the mobile device since the pathway does not include the local bus.

Further Embodiments

Note that the methods of FIGS. 3-5 may be used in conjunction. For example, the USB hub in the mobile device may allow for the memory medium of the mobile device and the processor (likely represented as the mobile device itself) to be recognized as two separate devices (e.g., a removable storage device, and the mobile device, possibly as USB devices). In some embodiments, the external device may be operable to simultaneously exchange data with both the memory medium of the mobile device and the mobile device itself (e.g., for firmware updates, accessing other memory mediums of the mobile device, etc.). Note that where USB is used, "simultaneous" may mean that the transfer of data is serialized and multiplexed (muxed) for both connection pathways; thus data may be sent through USB at the same time in a multiplexed fashion. In other words, as the USB is a serial bus, data for only one transfer is present on the bus at any one time, but the data from two different sources (or to two different targets) is interleaved on the USB in a multiplexed fashion, and thus the transfers are said to be "simultaneous".

Thus, the USB hub of the mobile device (e.g., of the chip in the mobile device) may allow for high speed connections between an external device and a memory medium of the mobile device and the external device and the processor of the mobile device (e.g., simultaneously). Note that the USB hub may allow multiple connections from multiple external devices as necessary. For example, in one embodiment, a first external device may be connected at high speed to the processor while a second external device may be connected at high speed to the memory medium. The USB hub may also allow for switching of the provided pathways between the first and second external devices. Note that this may apply to more than two external devices (or internal devices), as desired.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A system that is configured to be incorporated in a mobile device, comprising:
    a first port that is configured to couple to an external device, wherein the first port comprises a universal serial bus (USB) port;
    a second port that is configured to couple to a memory medium of the mobile device;
    a third port that is configured to couple to a processor of the mobile device;
    a USB hub coupled to the first port, the second port, and the third port, wherein the USB hub is configured to:
        provide a first pathway between the first port and the second port, wherein the first pathway is configured to allow transfer of data between the external device and the memory medium, wherein the processor of the mobile device is not required to perform transfer of data between the external device and the memory medium; and
        provide a second pathway between the first port and the third port, wherein the second pathway is configured to allow transfer of data between the external device and the processor.

2. The system of claim 1, wherein the USB hub is configured to provide a super speed USB connection between the external device and the memory medium.

3. The system of claim 1, wherein the USB hub is configured to provide USB 3.0 communication between the external device and the memory medium.

4. The system of claim 1, wherein the system is further configured to:
    provide a third pathway between the second port and the third port, wherein the third pathway is configured to allow communication between the processor and the memory medium.

5. The system of claim 1, further comprising:
a memory controller of the memory medium, wherein the USB hub is coupled to the memory controller, and wherein the memory controller is configured to couple to the processor separate from the USB hub.

6. The system of claim 1, wherein the processor is coupled to the memory via a memory multiplexer, wherein the memory multiplexer is configured to provide a pathway between the processor and the memory medium, independent of the USB hub.

7. The system of claim 1, wherein the system is configured to be enumerate the memory medium as a USB mass storage device.

8. The system of claim 1, wherein the system is configured to be enumerate the memory medium as a media transfer protocol (MTP) device.

9. The system of claim 1, further comprising:
a direct memory access (DMA) controller coupled to the USB hub, wherein the DMA Controller is configurable to perform transfer of data between the external device and the memory medium.

10. The system of claim 9, further comprising:
a processor coupled to the USB hub, wherein the processor is configured to configure the DMA controller to perform the transfer of data between the external device and the memory medium.

11. A method, comprising:
establishing a connection with an external device, wherein the external device is connected to a mobile device via a first port;
providing a first pathway between the external device and a memory medium of the mobile device using a universal serial bus (USB) hub, and wherein the pathway between the external device and the memory medium does not include a processor of the mobile device;
transferring data between the external device and the memory medium of the mobile device using the first pathway, wherein said transferring data does not comprise use of the processor of the mobile device
providing a second pathway between the external device and the processor using the USB hub; and
transferring data between the external device and the processor of the mobile device using the second pathway.

12. The method of claim 11, wherein said transferring data between the external device and the memory medium is performed at a USB super speed transfer rate.

13. The method of claim 11, wherein the USB hub comprises a USB 3.0 hub.

14. The method of claim 11, further comprising:
providing a third pathway between the processor and the memory medium using the USB hub; and
transferring data between the processor and the memory medium using the third pathway.

15. The method of claim 11, further comprising:
providing a third pathway between the processor and the memory medium, wherein the third pathway is separate from the USB hub.

16. The method of claim 15, wherein the third pathway utilizes a memory multiplexer.

17. The method of claim 11, wherein said providing the first pathway comprises enumerating the memory medium as a USB mass storage device.

18. The method of claim 11, wherein said providing the first pathway comprises enumerating the memory medium as a media transfer protocol (MTP) device.

19. The method of claim 11, wherein said transferring data between the external device and the memory medium comprises using a direct memory access (DMA) controller coupled to the USB hub.

20. The method of claim 19, wherein said transferring data between the external device and the memory medium comprises using a processor to configure the DMA controller to perform said transferring.

* * * * *